United States Patent
Armstrong

(10) Patent No.: US 6,237,922 B1
(45) Date of Patent: May 29, 2001

(54) MECHANICAL DUTY RUBBER BELLOWS

(76) Inventor: Richard James Armstrong, 7 Jackes Ave. Apt. 703, Toronto, Ontario (CA), M4T 1E3

(*) Notice: Subject to any disclaimer, the term of this patent is extended or adjusted under 35 U.S.C. 154(b) by 0 days.

(21) Appl. No.: 09/170,229

(22) Filed: Oct. 13, 1998

(51) Int. Cl.[7] .......................................... F16S 3/00
(52) U.S. Cl. ............................................ 277/634; 277/636
(58) Field of Search ................................... 277/315, 391, 277/634, 636; 285/235, 236, 237; 428/36.9, 39.91

(56) References Cited

U.S. PATENT DOCUMENTS

| | | | |
|---|---|---|---|
| 3,241,844 | * 3/1966 | Morley | 277/391 X |
| 4,469,467 | * 9/1984 | Odill et al. | 285/236 X |
| 4,587,145 | * 5/1986 | Kanao | 428/36.9 X |
| 5,087,493 | * 2/1992 | Wang | 428/36.9 |

* cited by examiner

Primary Examiner—Robert J. Sandy
Assistant Examiner—Karlena D Schwing

(57) ABSTRACT

A mechanical duty bellows seal is constructed from a number of annular rubber diaphragms of comparatively thick cross-section alternately bonded to a series of outer and inner metal hoops so that the hoops hold the rubber diaphragms in simple shear during flexure of the bellows. The stresses in the rubber in shear are predictable thus allowing the calculation of diaphragm proportions to control stress levels.

14 Claims, 1 Drawing Sheet

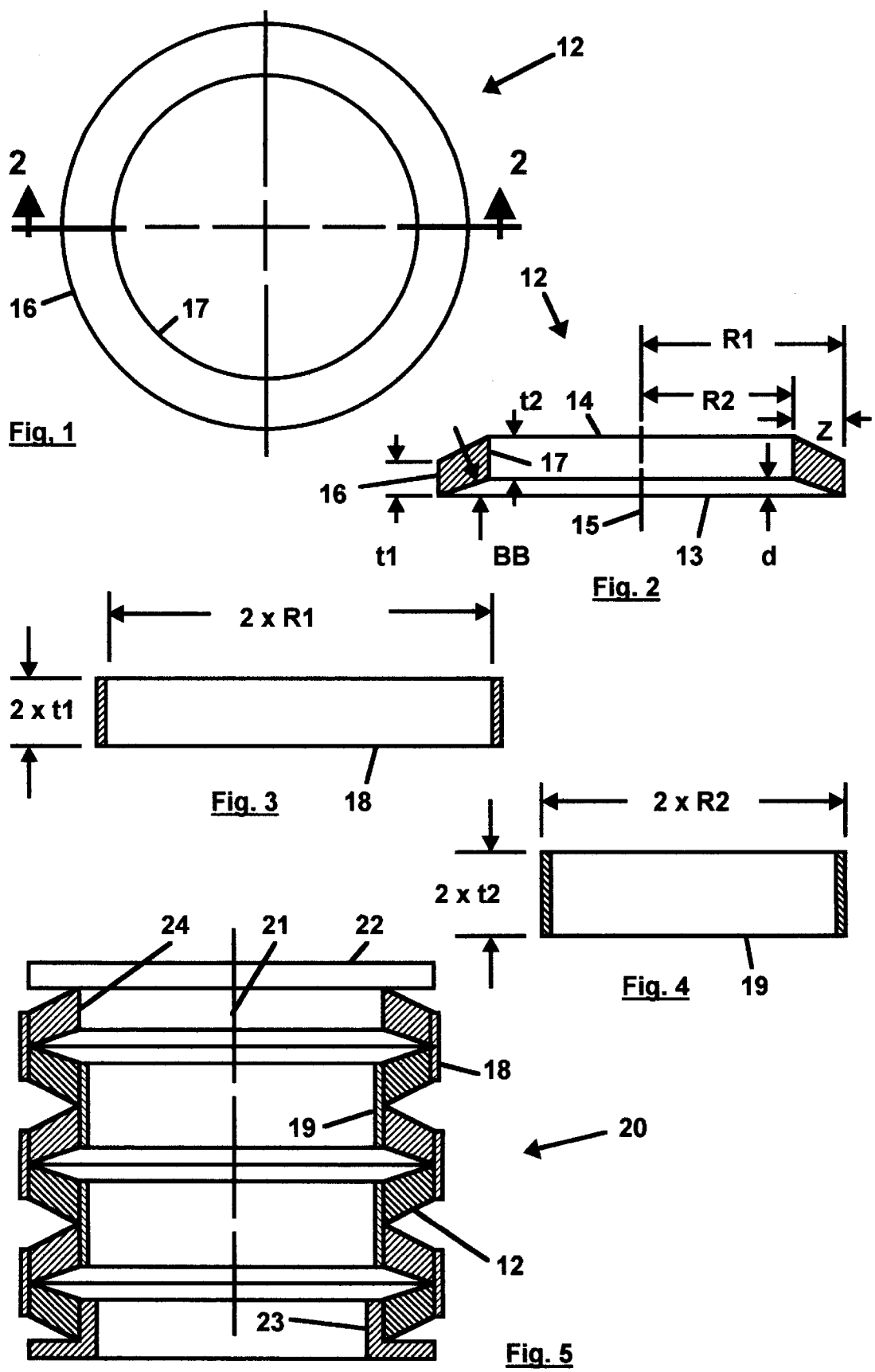

MECHANICAL DUTY RUBBER BELLOWS

FIELD OF THE INVENTION

This invention relates to mechanical duty bellows employed as dynamic pressure seals where a positive seal without leakage is made between moving parts.

BACKGROUND

A bellows as a dynamic or movable pressure seal is often employed for sealing a reciprocating plunger or similar device where one end of the bellows is fixed and the other attached to the moving plunger. A bellows is selected because it is leak-proof and a long stroke may be had by simply providing a sufficient number of convolutions. The flexing of the bellows is accomplished by a bending of the bellows material at the convolutions. This bending action is characteristic of all prior types of bellows.

Prior types of bellows intended for such dynamic use are usually made from metal, either stretch formed from a metal tube or brazed-up from metal diaphragms. These bellows are of limited flexural life due to the bending of the metal at the convolutions which generates unpredictable stresses and leads to early fatigue cracking. Metal bellows are thus limited to low frequency operation or occasional use. A further disadvantage with metal bellows is their sensitivity to vibration which can cause premature fatigue cracking.

Another type of bellows is made from rubber, either molded in one piece or made up from separate rubber diaphragms sewn together. However this type of rubber bellows is intended for use as a dust cover and the like and is not suitable for pressure service.

Details of the design and application of both prior types of bellows can be found in the manufacturer's literature. An excellent listing of manufacturers of all types of bellows is given in the current publication of;

The Thomas Register of American Manufacturers
Five Penn Plaza, New York N.Y. 10001 USA
Published annually There is a need for a long stroke positive pressure seal which can be operated at high cycle rates for extended periods. Up to now the usual solution for high-speed reciprocating service has been to employ a sliding seal such as a rod sealed by packing or pre-formed rings. Sliding seals always permit some leakage and are thus not positive sealing. Also they have the disadvantage of requiring lubrication which in some applications is objectionable.

THE INVENTION

I have found that by constructing a bellows from a number of annular rubber diaphragms of comparatively thick cross-section alternately bonded to a series of outer and inner metal hoops, a dynamic seal having a long service life results. The metal hoops limit the rubber diaphragms to simple shear loading only during flexure of the bellows and since the stresses for rubber in simple shear are predictable, it is possible to calculate suitable dimensions for the diaphragms to control shear stresses within acceptable levels and a long stroke positive pressure seal having an extended service life at high reciprocating speeds is obtained.

It is to be understood that the expression, simple shear, is taken as meaning a shear action without bending or stretching of diaphragm. This occurs where the shear strain is moderate as more fully explained hereinafter.

IN THE DRAWINGS

FIG. 1 is a plan view of the preferred form of a rubber diaphragm employed in constructing a bellows;

FIG. 2 is a diametrical section along the line 2—2 in FIG. 1;

FIG. 3 is a diametrical section of the preferred form of outer hoop employed in constructing a bellows;

FIG. 4 is a diametrical section of the preferred form of an inner hoop employed in constructing a bellows; and FIG. 5 is a diametrical section of the preferred form of a bellows constructed from diaphragms and hoops according to the present invention.

DETAILED DESCRIPTION OF THE PREFERRED EMBODIMENT OF THE INVENTION

With reference to FIG. 1 and FIG. 2 an annular rubber diaphragm indicated generally as 12 has a hollow conical shape with a base 13 and a truncated apex 14 both normal to an axis of radial symmetry 15. The apex 14 is displaced a predetermined axial distance d away from base 13. The displacement d imparts the hollow conic shape to diaphragm 12 and gives an angle BB to the interior conic surface.

Diaphragm 12 has an outer cylindrical wall 16 extending from base 13 toward apex 14. Wall 16 is defined by a first radius R1 from radial axis 15 and has a predetermined axial width t1. Also has an inner cylindrical wall 17 extends from apex 14 toward base 13. Wall 17 is defined by a second radius R2 from radial axis 15 and has a predetermined axial width t2.

The diaphragm radial section as shown in FIG. 2 is thus characterized by an outer radius R1, an inner radius R2 with a section width of Z so that R1−R2=Z. The section has an outer wall of width t1 and an inner wall of width t2 displaced from each other a distance d forming an interior conic angle BB.

Diaphragms 12 may be made from the many commercially available elastomers, a selection being made with consideration being given to the operating environment to which the diaphragms are exposed. Professional practice should be followed in this selection. The name rubber as used herein is intended to mean any elastomer, whether a natural rubber compound or a synthetic rubber.

It is preferable to employ a solid rubber compound, the use of fabric or other woven reinforcement is not recommended since such inclusions can lead to destructive heat build-up during high speed reciprocation.

With reference to FIG. 3 an outer cylindrical hoop 18 is shown and has an inner diameter substantially equal to twice the first radius R1 of diaphragm 12. The axial width of hoop 18 is substantially equal to twice the axial width t1 of outer wall 16.

With reference to FIG. 4 an inner cylindrical hoop 19 is shown and has an outer diameter substantially equal to twice the second radius R2 of diaphragm 12. The axial width of hoop 19 is substantially equal to twice the axial width t2 of inner wall 17.

The expression, substantially equal to, means the hoops 18 and 19 should be a light interference fit on diaphragm 12 to ensure a good bond of the metal to the rubber. However the interference should not be too tight a fit since this can lead to pre-loading of the rubber and increased stress levels during use. As a guide the radial compression of the rubber between the outer and inner hoops is preferably not more than three percent.

It should be understood that while metal is the preferred material for making the hoops, other materials may also be employed. The principal requirements are the hoops should be sufficiently stiff to resist warping, stretching, or buckling in use and that a good bond with the rubber can be obtained. Metal is admirably suited to these requirements.

With reference to FIG. 5 a bellows indicated generally as 20 is shown built up from a plurality of diaphragms 12 assembled concentrically on a common axis 21 in alternate base-to-base and apex-to-apex contact thereby providing outer wall pairs and inner wall pairs in contact. A number of outer hoops 18 are bonded, one about each outer wall pair and a number of inner hoops 19 are bonded, one within each inner wall pair thus forming a bellows.

Any number of diaphragms 12 and hoops 18, 19 may be assembled to form a bellows, the number of diaphragms selected will depend upon the stroke required for the bellows seal as more fully explained hereinafter.

To ready the bellows for use the end diaphragms 12 must be bonded to mounting flanges or end plates 22 and 23 at each free end. The design of end plates 22 and 23 will be governed by the requirements of mounting which will be determined by a specific application. Whatever the application requirements for mounting the end plates are, a cylindrical portion 24, preferably of metal, and having a diameter of substantially twice the second radius R2 and a width substantially equal to inner wall width t2 must be provided on the end plates 22 and 23 for bonding to the inner wall 17 of each end diaphragm 12. The interference fit of cylindrical portions 24 to end diaphragms 12 should be within the same limits as for the hoops 18 and 19.

The bonding of the hoops and end plates to the diaphragms should be accomplished using recommended bonding adhesives and procedures for metal to rubber bonds. The adhesive manufacturer's recommendations as to the type of adhesive and the method of employment should be strictly followed.

The rubber bonds support the axial component of a pressure differential applied to the bellows. For internal pressure the outer hoop bond of each diaphragm supports one-half the pressure load. The inner hoop bond pressure loads are balanced out by adjacent diaphragms. The loading is reversed for internal vacuum with the bonds at the inner hoops supporting one-half the vacuum load and the outer hoop loads being balanced. The axial loads due to shear strain are balanced out by adjacent diaphragms thus only the pressure or vacuum loads are used when calculating axial bond loads. An externally applied pressure differential, other than that due to vacuum, is not recommended because a high externally applied pressure can damage the rubber bonds during reciprocation of the bellows.

The tension component of shear displacement develops a tension load on the bonds but with the dimensional relationships given herein the tension stress is very small. Its possible effect on the hoops is explained hereinafter.

The diaphragms may be considered as pairs with two diaphragms assembled base-to-base, thus the bellows shown in FIG. 5 is made up from three pairs. This is not a physical requirement but a convention I have adopted to simplify calculations and specification of a bellows design. The bellows in FIG. 5 is shown ending with an apex at each end. It is also possible to end with a base at one or both ends if the requirement presents itself. In this case the end plates would have to be modified to provide a suitable cylindrical portion with a diameter of twice the first radius and a width equal to the outer wall width t1. I have found the apex ending the most convenient for bonding to the end plates.

The relative dimensions of the diaphragms are an essential part of the invention. The diaphragms must be proportioned to take full advantage of the simple shear loading effected by the hoops. There are preferred dimensionless relationships between the proportions of diaphragms 12 and these are:

The product radius times local diaphragm axial thickness is constant so that $R1 \times t1 = R2 \times t2$;

The ratio $Q = Z/R1$ defined as the spread ratio is preferably less than 0.3;

The ratio $B = d/Z$ defined as the deflection ratio is preferably less than 1.0;

The ratio $S = t1/Z$ defined as the slenderness ratio is preferably greater than 0.5;

The root thickness ratio defined as $TR = (t1/d)\sin BB \sin(90-BB)$ is preferably greater than 0.5. [angle $BB = \arctan(d/Z)$].

The product radius times axial thickness determines the circumferential section area at any given radius from axis 15 and if the product is constant the area is constant. This gives equal unit loading throughout the diaphragm during operation and avoids stress concentrations which could lead to undesirable bending strains. Strictly followed the constancy of product would result in a curvature of the diaphragm conic surfaces, however with the value of Q being less than 0.3 this curvature is very slight and can be ignored and a straight conic line between walls 16 and 17 substituted. However the equality of $R1 \times t1 = R2 \times t2$ still applies.

Notwithstanding the previous statement, the equality of the product may in some cases be ignored. Rearranging the equality in the form $R1/R2 = t1/t2$ it can be seen that as the spread ratio Q becomes smaller the values of $R1/R2$ and $t1/t2$ approach unity. Thus for small values of Q, t1 may be made equal to t2. This condition could exist where the difference between t1 and t2 as calculated from the equality was in the range of commercial molding tolerances and thus could be ignored.

The spread ratio is Q limited to less than 0.3 because large values lead to very stiff bellows. Also a large value for the spread ratio together with the constancy of the product radius times thickness can lead to inordinately large values for the inner wall width t2. I commonly employ a value near 0.2 for the spread ratio in design work.

The deflection ratio B determines the maximum shear strain and is limited to less than 1.0 because higher values lead to high stress levels in the rubber during operation of the bellows. Since high stress tends to shorten service life, low values of d/Z are desirable. On the other hand with smaller values of B more diaphragms in the bellows are required to give a desired stroke. I commonly employ a value near 0.6 for the deflection ratio in design work.

A minimum value for the slenderness ratio S ensures a stable diaphragm to resist bulging due to a pressure difference.

A value of the root thickness ratio TR greater than 0.5 ensures stability from buckling of the diaphragm 12 during displacement. Also a larger value results in increased wall widths t1 and t2 which allow a greater pressure difference to be born by the bond.

Use of the Invention

To employ the invention it is necessary to calculate the diaphragm dimensions keeping in mind the preferred limits as given. The following is a method of design which when employed will result in a bellows according to the present invention.

METHOD OF DESIGN

Nomenclature:
R1 outside radius of the diaphragm, inches
R2 inside radius of the diaphragm, inches
Z diaphragm section width, inches B deflection ratio
S slenderness ratio
N number of diaphragm pairs
P allowable internal pressure, psi gage
Su allowable shear stress on the rubber bond, psi
TILT maximum tilt angle between the ends of the bellows, degrees
AR effective internal area of the bellows, square inches
LN overall length of the bellows in the relaxed state, inches
VP internal vacuum pressure, psi absolute
VF vacuum safety factor
NF a factor used to modify N, the number of diaphragm pairs needed for the required stroke The vacuum safety factor VF gives the ratio of shear load on the inner hoop bonds due to internal vacuum to the maximum allowable shear load as calculated from the bond area and shear stress Su. A value of VF greater than 2.0 is preferred.

The factor NF is employed because a diaphragm cannot be displaced the full distance d. Depending upon the axial thickness t as determined from S and the value of d, there will be a slight axial bulging of the diaphragms which will interfere with the stroke. The factor NF takes this into consideration and adjusts the number N to ensure the required stroke is obtained without interference.

Design Procedure

Required inputs are diameter of bellows, required stroke, allowable shear stress Su on rubber bond and if applicable the internal vacuum pressure VP.

Select a trial diameter in inches from which R1=diameter/2 inches

Select a value for Q
    Z=Q×R1 inches
    R2=R1−Z inches
    Select a value for B
    BB=arc tan B degrees
    Select a value for TR
    S=TR×B/[(sin BB sin(90−BB)]
    d=B×Z inches
    t1=S×Z inches
    t2=R1×t1/R2 inches
    NF=(B+2.2)/2
    N=NF×stroke/(2×d) round off up to next whole number
    P=4×Su×R1×t1/(R1$^2$−R2$^2$) psi
    TILT=1.2×N×arc tan [d/(2×R2)] degrees
    AR=Pi×R1$^2$ square inches
    LN=2×N(d+t2) inches
    VF=2×R2×t2×Su/(14.7−VP)(R1$^2$−R2$^2$)

EXAMPLE

A bellows is required having a stroke of 1.5 inches, a diameter of not more than 3.5 inches and to operate at 100 psi internal pressure down to a vacuum of 2.7 psi absolute. The allowable shear stress on the rubber bonds is 80 psi. ps
Solution:
    Let diameter=3.0 inches
    R1=3/2=1.5 inches
    Select Q=0.2
    Z=0.2×1.5=0.3 inches
    R2=1.5−0.3=1.20 inches
    Select B=0.4
    Angle BB=arc tan0.4=21.80 degrees
    Select TR=0.5
    S=0.5×0.4/[(sin21.8 sin(90−21.8)]=0.58
    d=0.4×0.3=0.12 inches
    t1=0.58×0.3=0.174 inches
    t2=1.5×0.174/1.2=0.217 inches
    NF=(0.4+2.2)/2=1.3
    N=1.3×1.5/(2×0.12)=8.125 or 9 pairs of diaphragms
    P=4×80×1.5×0.174/(1.5$^2$−1.2$^2$)=103 psi
    TILT=1.2×9×arc tan[0.12/(2×1.2)]=30 degrees
    AR=Pi×1.5$^2$=7.069 square inches
    LN=2×9×(0.12+0.217)=6.07 inches
    VF=2×1.2×0.217×80/(14.7−2.7)×(1.5$^2$−1.2$^2$)=4.29

Since VF>2.0 the internal vacuum of 2.7 psi absolute is acceptable.

This completes the design of the rubber diaphragms. To complete the bellows design it is necessary to determine the thickness of the selected metal for the hoops.

The hoops support the entire radial component of a pressure differential applied to the bellows. The thickness of hoops 18 and 19 must be calculated to withstand the pressure differential in tension for internal pressure and in compression for an internal vacuum. For internal pressure each hoop must support the pressure load due to the internal pressure acting on the internal cylindrical area of the hoop. Conversely each hoop must support any vacuum load on the outer cylindrical area of the hoop.

In addition to strength, stiffness in handling of the hoops can be an important consideration in some designs. For the Example given herein hoops made from commercial grade aluminum alloy with a thickness of 0.08 inches would be satisfactory both for strength and stiffness.

It is often the case that stiffness is the more important criterion for hoop thickness. The hoops are subjected to radially directed tension loads as a result of the tension component of shear strain applied to the rubber diaphragms. This can cause uneven buckling of the hoops if they are made from thin material. Thus the hoops while of satisfactory strength may fail due to buckling by the rubber pulling on the bonds. A satisfactory hoop thickness to resist buckling can be determined from TH=0.025×D where D is the diaphragm diameter and TH the minimum hoop thickness, all in inches. For ease in handling, the hoop thickness for small bellows under one inch in diameter is preferably not less than 0.03 inches.

An excellent reference for determining hoop thickness for strength and stiffness is the publication;
    Formulas for Stress and Strain 5th edition 1975
    Raymond J. Roark and Warren C. Young
    McGraw-Hill Book Company.

It should be noticed that the limiting factors affecting the allowable pressure P are the shear stress Su and the root thickness ratio TR. If a calculation resulted in insufficient allowable pressure one or both of these factors would have to be increased. The slenderness ratio S as calculated determines the widths t1 and t2 of the walls and thus the section thickness. Increased section thickness leads to increased stiffness and a value of the slenderness ratio S greater than 2 is not recommended. This limits the value of TR in combination with deflection ratio B. This in turn will ultimately limit the allowable internal pressure difference to a value less than 4.5×Su psi gage.

The bellows may be made in any size required for an application. There is no limitation on size from a design standpoint from fractional to several inches in diameter. Any number of diaphragms may be assembled with the hoops to provide a bellows of any required length.

Operation of the Bellows

In operation the free ends of the bellows must be bonded to suitable end plates for mounting. The bellows may be contracted the required stroke and returned but it may not be extended beyond its free length. To do so will cause damage to the rubber bonds.

The bellows may be tilted during operation if the application requires. It is emphasized that the tilt must be accomplished by a contraction of one side but not by extension.

The bellows has a built in spring rate due to shear displacement of the rubber diaphragms, thus the bellows is self restoring. However, the drive means and moving end plate should be positively driven and not driven on the return by the bellows.

In many cases the bellows spring rate is a small value compared to the force due to a pressure differential. In the Example given the spring force at fully flat would be about 65 pounds for diaphragms made with 60 durometer rubber. On the other hand the force due to pressure could be 103×7.069=728.1 pounds.

The spring rate in shear, determined from the shear modulus, is a function of the rubber hardness or durometer and shear strain. With rubber the shear modulus varies with shear strain thus the spring rate for any particular bellows will not be constant. Reference to the literature should be had if the spring rate is a consideration in a bellows application.

An excellent reference for rubber spring design information is the publication;

Handbook of Molded and Extruded Rubber 2nd edition 1959

The Goodyear Tire & Rubber Company

Akron Ohio USA

Diaphragms 12 may be made from rubber within a hardness range of 30 to 70 durometer which is the usual range for rubber in shear applications.

A bellows designed as specified herein can be operated at high cycle rates at full rated pressure for extended periods. I commonly operate bellows at 1700 cycles per minute. For a bellows operating without a pressure differential the frequency limit would be reached where the acceleration of the bellows moving end, impelled by the rubber spring force, lagged behind the acceleration of the drive means. Under this condition there would be a pull on the bellows with possible damage to the rubber bonds. A positive internal pressure will help to accelerate the bellows moving end and under this condition higher operating frequencies will be possible. However the bellows end must always match the acceleration of the drive means to prevent a tension on the rubber bonds.

As previously stated the bellows may also be tilted from the common axis so that the end plates are at an angle to each other. The allowable tilt is given by the design method as TILT. The allowable tilt should not be exceeded since excessive tilt can lead to bond failure in tension.

It is permissible to operate a bellows as a seal employing together, required stroke, maximum tilt, and full rated pressure differential at maximum cycle rate. This combination gives great versatility to the bellows as a dynamic pressure seal.

A bellows according to the present invention is particularly suitable for use where severe vibration may be encountered. Rubber diaphragms alternately bonded to metal hoops serve to isolate vibration by reflection at the multiple bonds and the rubber can absorb the vibration energy without fatigue failure.

The present bellows may also be employed in applications where sudden pressure variations are encountered. The rubber diaphragms held by the metal hoops are compliant to shock loads such as may be encountered with pressure fluctuations. This bellows would be particularly suitable where the fluid sealed is a liquid and waterhammer phenomena are present.

The invention thus provides a positive dynamic pressure seal which may be employed for applications requiring high speed reciprocation with long service life.

I claim:

1. A mechanical duty bellows comprising:

a plurality of annular rubber diaphragms (12) of conical shape, and each having a base (13) and truncated apex (14) both normal to an axis of radial symmetry (15);

each of said diaphragms having an outer cylindrical wall (16) of predetermined axial width (t1) extending axially from said base toward said apex and defined by a first radius (R1) from said radial axis;

each of said diaphragms having an inner cylindrical wall (17) of predetermined axial width (t2), extending axially from said apex toward said base and defined by a second radius (R2) from said radial axis, said inner wall being displaced axially away from said base a predetermined distance to impart said conical shape (d);

said plurality of diaphragms being assembled concentrically on a common axis (21) in alternate base-to-base contact and apex-to-apex contact thereby providing outer wall pairs and inner wall pairs;

outer cylindrical metal hoops (18) each one having an inner diameter substantially equal to twice said first radius and an axial width substantially equal to twice said outer wall width, one of said outer hoops being bonded about each said outer wall pairs; and inner cylindrical metal hoops (19) each one having an outer diameter substantially equal to twice said second radius and an axial width substantially equal to twice said inner wall width, one of said inner hoops being bonded within each said inner wall pairs.

2. A bellows as claimed in claim 1 wherein the value of TR in the expressions, (t1/d)=(outer wall width/axial displacement)

angle BB=arctan [axial displacement/(first radius−second radius)]

TR=(t1/d)×sin BB×sin (90−BB)

is greater than 0.5.

3. A bellows as claimed in claim 2 wherein the bellows terminates with a single inner wall at each end; and an end plate at each bellows end characterized by a cylindrical portion having a diameter substantially equal to twice said second radius and an axial width substantially equal to said inner wall width, the cylindrical portion being bonded within the single inner wall to complete a bellows ready for use.

4. A bellows as claimed in claim 1 wherein the bellows terminates with a single inner wall at each end; and an end plate at each bellows end characterized by a cylindrical portion having a diameter substantially equal to twice said second radius and an axial width substantially equal to said inner wall width, the cylindrical portion being bonded within the single inner wall to complete a bellows ready for use.

5. A mechanical duty bellows comprising:

a plurality of annular rubber diaphragms (12) of conical shape, and each having a base (13) and truncated apex (14) both normal to an axis of radial symmetry (15);

each of said diaphragms having an outer cylindrical wall (16) of predetermined axial width (t1) extending axially from said base toward said apex and defined by a first radius (R1) from said radial axis;

each of said diaphragms having an inner cylindrical wall (17) of predetermined axial width (t2), extending axially from said apex toward said base and defined by a second radius (R2) from said radial axis, said inner wall being displaced axially away from said base a predetermined distance to impact said conical shape (d);

and wherein the product of said first radius times said outer wall width is equal to the product of said second radius times said inner wall width (R1×t1=R2×t2);

said plurality of diaphragms being assembled concentrically on a common axis (21) in alternate base-to-base contact and apex-to-apex contact thereby providing outer wall pairs and inner wall pairs;

outer cylindrical metal hoops (18) each one having an inner diameter substantially equal to twice said first radius and an axial width substantially equal to twice said outer wall width, one of said outer hoops being bonded about each said outer wall pairs; and inner cylindrical metal hoops (19) each one having an outer diameter substantially equal to twice said second radius and an axial width substantially equal to twice said inner wall width, one of said inner hoops being bonded within each said inner wall pairs.

6. A bellows as claimed in claim 5 wherein the value of TR in the expressions, (t1/d)=(outer wall width/axial displacement)

angle BB=arctan [axial displacement/(first radius−second radius)]

TR=(t1/d)×sin BB×sin (90−BB)

is greater than 0.5.

7. A bellows as claimed in claim 6 wherein the bellows terminates with a single inner wall at each end; and an end plate at each bellows end characterized by a cylindrical portion having a diameter substantially equal to twice said second radius and an axial width substantially equal to said inner wall width, the cylindrical portion being bonded within the single inner wall to complete a bellows ready for use.

8. A bellows as claimed in claim 5 wherein the bellows terminates with a single inner wall at each end; and an end plate at each bellows end characterized by a cylindrical portion having a diameter substantially equal to twice said second radius and an axial width substantially equal to said inner wall width, the cylindrical portion being bonded within the single inner wall to complete a bellows ready for use.

9. A mechanical duty bellows comprising:

a plurality of annular rubber diaphragms (12) of conical shape, and each having a base (13) and truncated apex (14) both normal to an axis of radial symmetry (15);

each of said diaphragms having an outer cylindrical wall (16) of predetermined axial width (t1) extending axially from said base toward said apex and defined by a first radius (R1) from said radial axis;

each of said diaphragms having an inner cylindrical wall (17) of predetermined axial width (t2), extending axially from said apex toward said base and defined by a second radius (R2) from said radial axis, said inner wall being displaced axially away from said base a predetermined distance to impart said conical shape (d);

and wherein the product of said first radius times said outer wall width is equal to the product of said second radius times said inner wall width (R1×t1=R2×t2);

and wherein the difference between said first and second radii is less than 0.3 times said first radius;

said plurality of diaphragms being assembled concentrically on a common axis (21) in alternate base-to-base contact and apex-to-apex contact thereby providing outer wall pairs and inner wall pairs;

outer cylindrical metal hoops (18) each one having an inner diameter substantially equal to twice said first radius and an axial width substantially equal to twice said outer wall width, one of said outer hoops being bonded about each said outer wall pairs; and inner cylindrical metal hoops (19) each one having an outer diameter substantially equal to twice said second radius and an axial width substantially equal to twice said inner wall width, one of said inner hoops being bonded within each said inner wall pairs.

10. A bellows as claimed in claim 9 wherein said predetermined distance is less than the difference between said first and said second radii [d<(R1−R2)].

11. A bellows as claimed in claim 10 wherein the quotient of said outer wall width divided by the difference between said first and said second radii is greater than 0.5[t1/(R1−R2)>0.5].

12. A bellows as claimed in claim 9 wherein the value of TR in the expressions, (t1/d)=(outer wall width/axial displacement)

angle BB=arctan [axial displacement/(first radius−second radius)]

TR=(t1/d)×sin BB×sin (90−BB) is greater than 0.5.

13. A bellows as claimed in claim 12 wherein the bellows terminates with a single inner wall at each end; and an end plate at each bellows end characterized by a cylindrical portion having a diameter substantially equal to twice said second radius and an axial width substantially equal to said inner wall width, the cylindrical portion being bonded within the single inner wall to complete a bellows ready for use.

14. A bellows as claimed in claim 9 wherein the bellows terminates with a single inner wall at each end; and an end plate at each bellows end characterized by a cylindrical portion having a diameter substantially equal to twice said second radius and an axial width substantially equal to said inner wall width, the cylindrical portion being bonded within the single inner wall to complete a bellows ready for use.

* * * * *